March 9, 1971      L. T. CAMPBELL      3,568,329

MAGNETIC FLUID COMPASS

Filed Oct. 28, 1968

*INVENTOR.*
LESLIE T. CAMPBELL
BY
ERVIN F. JOHNSTON
ATTORNEY.

United States Patent Office 3,568,329
Patented Mar. 9, 1971

3,568,329
MAGNETIC FLUID COMPASS
Leslie T. Campbell, Lakewood, Calif., assignor to the United States of America as represented by the Secretary of the Navy
Filed Oct. 28, 1968, Ser. No. 771,223
Int. Cl. G01c 17/08
U.S. Cl. 33—223
5 Claims

ABSTRACT OF THE DISCLOSURE

A magnetic compass which includes a bar magnet; a fluid compartment which encloses the magnet; a needle support means mounted within the compartment so as to support the magnet for rotation in a horizontal plane; and buoyant material mounted on the magnet for supporting the magnet in the fluid with a slight negative buoyancy so that friction at the needle support is at a minimum; and a small slave bar magnet rotatably mounted to the compartment and in axial alignment with the large bar magnet so as to follow the movements of the large bar magnet.

---

The invention described herein may be manufactured and used by or for the Government of the United States of America for governmental purposes without the payment of any royalties thereon or therefor.

In some applications of underwater vehicle work it has become necessary to determine at a surface ship the orientation of the underwater vehicle. This may be accomplished by a large magnetic compass and a small slave magnet wherein a transmitter transmits to the surface ship the movements of the slave magnet as it follows the direction of the large bar magnet. It is necessary that the large bar magnet be considerably larger than the slave magnet so that the large bar magnet will accurately orient its position with regard to magnetic north. In the past the weight of the bar magnet has presented a problem in achieving the desired accuracy due to the high friction between the magnet and its support.

I have found that by attaching buoyant material to the large bar magnet and disposing the magnet and buoyant material within a chamber containing a fluid, such as oil, the friction at the support for the bar magnet can be kept at a minimum. In this manner the large bar magnet is highly responsive to movements and will quickly orient itself with magnetic north. In turn, the slave magnet is strongly influenced by the much larger bar magnet and will quickly follow the movements thereof. I have also provided other improvements such as: a means for disengaging the support means from the large bar magnet during shipment; a means for preventing permanent disengagement of the support means from the bar magnet during operation; and a means for equalizing fluid pressure about the bar magnet with the ambient pressure about the compass.

Figure 1:
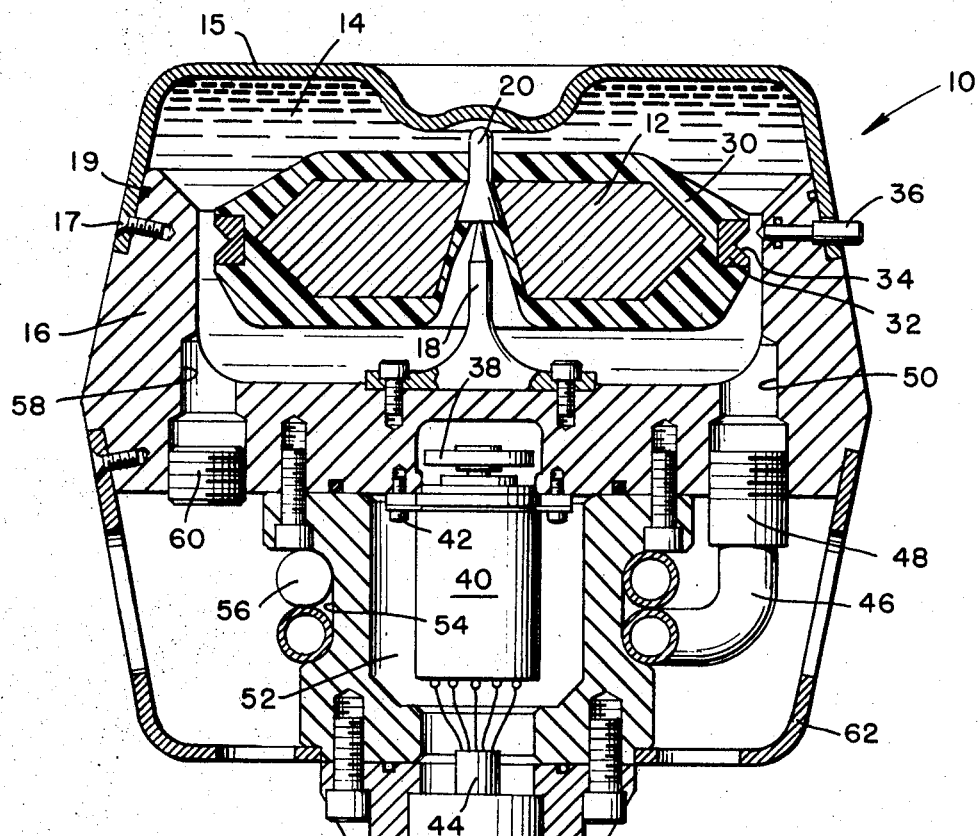
Figure 2:
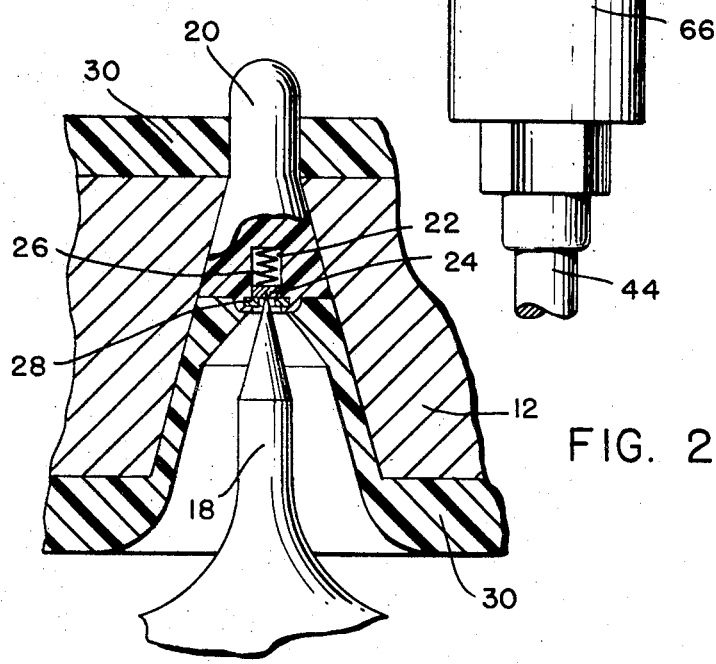

An object of the present invention is to provide an improved magnetic compass wherein friction between the compass and its support is kept at a minimum;

Another object is to provide a magnetic compass transmitter with a large bar magnet and a slave magnet wherein friction between the large bar magnet and its support is kept at a minimum;

A further object is to provide a magnetic compass transmitter wherein the weight of the magnet thereof can be easily removed from its support during shipment;

Still another object is to provide a magnetic compass transmitter which can be easily transported without damage and which can be utilized in a deep ocean environment to accurately and responsively indicate orientation with regard to magnetic north;

Other objects and many of the attendant advantages of this invention will be readily appreciated as it becomes better understood by reference to the description and accompanying drawing which follows:

FIG. 1 is a vertical cross sectional view of a magnetic compass transmitter which is an exemplary embodiment of the present invention; and FIG. 2 is an enlarged vertical cross sectional view of the support means for the large bar magnet of FIG. 1.

Referring now to the drawing wherein like reference numerals designate like or similar parts throughout the several views, there is shown in FIG. 1 a magnetic compass transmitter 10 which is an exemplary embodiment of the present invention. The magnetic compass transmitter 10 includes a large bar magnet 12 which is disposed within a fluid compartment 14. The fluid compartment 14 may be composed of top and bottom shells 15 and 16 which may be interconnected by screws 17, and O ring 19.

A needle support means may be mounted within the compartment 14 for supporting the magnet 12 for rotation in a horizontal plane. The needle support means may include a needle 18 and an insert 20 which may be located within and along the axis of the magnet 12. As shown in FIG. 2 the insert 20 may be provided with a bottom longitudinal recess 22 which slideably receives a bearing 24. The bearing 24, which may be a sapphire jewel, is provided with a bottom V for receiving the pointed end of the needle 18. Within the recess 22 there may be provided a compression spring 26 for downwardly biasing the bearing 24, and the bearing 24 may be limited in its downward movement by a keeper 28. Accordingly, when the compass 10 undergoes minor shock conditions the delicate point of the needle 18 will be protected by the cushioning effect of the spring 26.

In order to limit upward movement of the magnet 12 the insert 20 may extend above the magnet and may be closely spaced from the inner surface of the top compartment shell 15. The insert 20 may have a rounded top and the inner surface of the top compartment shell 15 may be rounded about the point of the needle 18. Accordingly, should the magnet 12 be jarred slightly upwardly the top of the insert 20 will quickly engage the top of the compartment shell 15 to prevent the needle 18 from becoming permanently disengaged from the bearing 24 during operation.

In the past the largeness of the magnet 12 has materially affected the responsiveness of the magnet due to friction between the needle point and the bearing 24. I have overcome this problem by attaching buoyant material 30 to the magnet 12 so that the magnet 12 and the components connected thereto have a slight negative buoyancy within the fluid of the chamber 14. In this manner friction at the needle support will be kept to a minimum and the maget 12 can be designed to any desired mass. In the exemplary embodiment the magnet 12 has been jacketed with the buoyant material 30. For this purpose I have found it desirable to construct the buoyant material 30 disc shape with a transverse bore for receiving the magnet 12. The buoyant material 30 may be syntatic foam which will provide the desired buoyancy and yet will withstand high pressures. With this arrangement I have found that a satisfactory fluid for the compartment 14 is oil with a viscosity of about 10 weight motor oil.

Under the most desirable conditions the needle support 18 for the magnet 12 is quite delicate and may be easily broken when the magnet is jarred during shipment. This problem may be overcome by providing a ring 32 about the magnet 12 or buoyant material 30 with an exterior V-shaped recess 34. Further, there may be located a plurality of pins 36, one of which is shown in FIG. 1, which are threaded through the wall of the compartment shell 15 with the longitudinal axis of the pins 36 being positioned slightly above the bottom of the V of the ring 32. In this manner when the pins 36 are screwed against the ring 32 the magnet 12 rides upwardly and the weight on the bearing 24 is removed from the needle 18 and this condition is maintained until the compass is ready for operation.

In the exemplary embodiment a small slave bar magnet 38 may be rotatably mounted to the compartment 14 below and in axial alignment with the large bar magnet 12. In this manner the slave magnet 38 will responsively follow the movements of the large bar magnet 12. The slave magnet 38 may be mounted to the input shaft of a synchro transmitter 40 which in turn may be mounted to the bottom of the compartment shell 16 by bolts 42. The synchro transmitter is connected by a cable 44 to a synchro receiver (not shown) at a surface ship for indicating at the surface ship the movements of the slave magnet 38.

If the compass 10 is to be utilized in a deep submergence environment it is desirable that the pressure within the compartment 14 be substantially equalized with ambient pressure. This may be accomplished by a bellows means which is in communication with the compartment 14. The bellows means may include a tube 46 which is connected into the interior of the compartment 14 by a threaded coupling 48 which is threaded into a compartment opening 50. A second compartment 52 may be mounted to the bottom of the compartment 14 for housing the synchro transmitter 40. The exterior of the compartment 52 may be provided with an annular recess 54 so that the tube 46 may be wrapped therearound to serve the function of a bellows for the compartment 14. The terminal end of the tube 46 is sealed by a cap or plug 56. Upon descent of the compass 10 within an ocean environment automatic pressure equalization is accomplished by means of the tube 46 collapsing and thereby distributing outside pressure to the inside of the compartment 14. Compartment opening 58 and threaded plug 60 are used to allow trapped air to escape when filling compartment 14 with oil via tube 46.

In order to protect the tube 46 from the outside environment a cage 62 may be mounted to the bottom of the fluid compartment 14. The housing for the cable 44, which is generally designated at 66, may be mounted by any simple means such as bolts to the bottom of the compartment 52.

Obviously many modifications and variations of the present invention are possible in the light of the above teachings. It is therefore to be understood that within the scope of the appended claims the invention may be practiced otherwise than as specifically described.

I claim:
1. In a magnetic compass transmitter, the combination comprising:
 a large bar magnet;
 a fluid compartment enclosing said magnet;
 needle support means mounted within said compartment and supporting said magnet for rotation in a horizontal plane;
 buoyant material mounted on said magnet for supporting the magnet in the fluid with a slight negative buoyancy so that friction at the needle support is at a minimum;
 a small slave bar magnet rotatably mounted to said compartment below and in axial alignment with the large bar magnet so as to follow the movements of the large bar magnet;
 a ring mounted about said large bar magnet, said ring having an exterior V shape recess; and
 a plurality of pins threaded through the wall of said compartment with the longitudinal axes of the pins located slightly above the bottom of the V of the ring so that when said pins are screwed against said ring the weight on said bearing is removed from said needle.
2. The combination as claimed in claim 1 including:
 bellows means in communication with said compartment; and
 means mounting the bellows means to said compartment.
3. The combination as claimed in claim 2 wherein:
 the mounting means includes a second compartment mounted to the bottom of the fluid compartment, the second compartment having an annular recess; and
 the bellows means including a tube which is wrapped around the second compartment within said annular recess.
4. The combination as claimed in claim 1 wherein the needle support means comprises:
 a needle;
 an insert mounted along the axis of the large bar magnet, said insert having a bottom recess;
 a bearing for receiving said needle, said bearing being slideably mounted within said recess; and
 a compression spring mounted within said recess for biasing said bearing toward said needle.
5. The combination as claimed in claim 4 wherein:
 said insert extends above said large magnet and has a top end which is rounded;
 said compartment has a rounded inner surface opposite the top end of the insert and is closely spaced therefrom so as to limit upward movement of said bearing from the needle.

References Cited

UNITED STATES PATENTS

| | | | |
|---|---|---|---|
| 2,132,168 | 10/1938 | Klein et al. | 33—223 |
| 2,294,990 | 9/1942 | Kollsman | 33—223 |

FOREIGN PATENTS

| | | | |
|---|---|---|---|
| 1,123,058 | 6/1956 | France | 33—223 |
| 10,277 | 1844 | Great Britain | 33—222 |
| 365,242 | 12/1922 | Germany | 33—224 |
| 497,565 | 9/1954 | Italy | 33—223 |

WILLIAM D. MARTIN, Jr., Primary Examiner